United States Patent
Zheng et al.

(10) Patent No.: US 12,127,543 B2
(45) Date of Patent: Oct. 29, 2024

(54) INSECT TRAP

(71) Applicant: NINGBO DAYANG TECHNOLOGY CO., LTD., Ningbo (CN)

(72) Inventors: Jun Zheng, Ningbo (CN); Yuanai Ning, Ningbo (CN)

(73) Assignee: NINGBO DAYANG TECHNOLOGY CO., LTD., Ningbo (CN)

(*) Notice: Subject to any disclaimer, the term of this patent is extended or adjusted under 35 U.S.C. 154(b) by 83 days.

(21) Appl. No.: 17/853,976

(22) Filed: Jun. 30, 2022

(65) Prior Publication Data

US 2022/0330536 A1 Oct. 20, 2022

Related U.S. Application Data

(63) Continuation of application No. PCT/CN2020/139790, filed on Dec. 27, 2020.

(30) Foreign Application Priority Data

Dec. 30, 2019 (CN) .......................... 201922425784.3

(51) Int. Cl.
*A01M 1/02* (2006.01)
*A01M 1/10* (2006.01)
*A01M 1/14* (2006.01)

(52) U.S. Cl.
CPC .............. *A01M 1/023* (2013.01); *A01M 1/10* (2013.01); *A01M 1/14* (2013.01)

(58) Field of Classification Search
CPC ........................ A01M 1/023; A01M 1/10–106

USPC .................................................... 43/107–123
See application file for complete search history.

(56) References Cited

U.S. PATENT DOCUMENTS

| 4,468,883 | A | * | 9/1984 | Williams | ............... | A01M 23/18 43/67 |
| 4,696,126 | A | * | 9/1987 | Grothaus | ................. | A01M 1/02 43/112 |
| 4,989,363 | A | * | 2/1991 | Doernemann | ...... | A01M 17/008 43/132.1 |
| 5,189,830 | A | * | 3/1993 | Montemurro | ........... | A01M 1/14 43/107 |

(Continued)

FOREIGN PATENT DOCUMENTS

| CA | 2802444 A1 * | 7/2013 | ............ A01M 1/023 |
| CN | 101696508 A | 4/2010 | |

(Continued)

OTHER PUBLICATIONS

Merged translation of CA-2802444-A1 (Year: 2013).*

(Continued)

*Primary Examiner* — Morgan T Jordan

(57) ABSTRACT

An insect trap includes a trap assembly and a trapping box provided with an opening in the upper end thereof, wherein a killing component is arranged in the trapping box; the trapping box is arranged below the trap assembly, and the bottom of the trapping box is connected to the trap assembly; and a space for insects to pass through is maintained between the trap assembly and the upper edge of the trapping box. The insect trap can lure insects moving around the insect trap into the trapping box, and can effectively prevent insects from climbing onto the trap assembly.

7 Claims, 4 Drawing Sheets

(56) References Cited

U.S. PATENT DOCUMENTS

| | | | | |
|---|---|---|---|---|
| 5,205,064 A * | 4/1993 | Nolen | A01M 1/023 | 43/112 |
| 5,205,065 A * | 4/1993 | Wilson | A01N 25/20 | 43/107 |
| 5,255,468 A * | 10/1993 | Cheshire, Jr. | A01M 1/06 | 43/112 |
| 5,382,422 A * | 1/1995 | Dieguez | A01N 59/04 | 424/45 |
| 5,647,164 A * | 7/1997 | Yates | A01M 1/023 | 43/132.1 |
| 5,669,176 A * | 9/1997 | Miller | A01M 1/023 | 43/132.1 |
| 5,799,436 A * | 9/1998 | Nolen | A01M 1/223 | 43/112 |
| 5,813,166 A * | 9/1998 | Wigton | A01M 1/06 | 43/107 |
| 6,050,025 A * | 4/2000 | Wilbanks | A01M 1/223 | 43/112 |
| 6,055,766 A * | 5/2000 | Nolen | A01M 1/023 | 43/112 |
| 6,305,122 B1 * | 10/2001 | Iwao | A01M 1/145 | 43/112 |
| 8,109,036 B1 * | 2/2012 | Wilbanks | A01M 1/223 | 43/112 |
| 8,402,690 B2 * | 3/2013 | Schneidmiller | A01M 1/023 | 43/123 |
| 10,426,154 B2 * | 10/2019 | Sanford | A01M 1/103 | |
| 10,701,924 B2 * | 7/2020 | Zheng | A01M 1/08 | |
| 10,729,115 B2 * | 8/2020 | Stevens | A01M 1/20 | |
| 10,791,726 B2 * | 10/2020 | Zheng | A01M 1/023 | |
| 2003/0051391 A1 * | 3/2003 | Jablin | A01M 1/023 | 43/139 |
| 2004/0128902 A1 * | 7/2004 | Kollars, Jr. | A01M 1/22 | 43/107 |
| 2004/0128904 A1 * | 7/2004 | Chen | A01M 1/08 | 43/139 |
| 2008/0148624 A1 * | 6/2008 | Borth | A01M 1/2022 | 43/132.1 |
| 2009/0277076 A1 * | 11/2009 | Boston | A01M 1/12 | 43/132.1 |
| 2011/0047860 A1 * | 3/2011 | Black | A01M 1/103 | 43/107 |
| 2011/0072712 A1 * | 3/2011 | Black | A01M 1/02 | 43/123 |
| 2011/0283597 A1 * | 11/2011 | Coventry | A01M 1/08 | 43/107 |
| 2012/0036763 A1 * | 2/2012 | Kay | A01M 25/004 | 43/131 |
| 2012/0060406 A1 * | 3/2012 | Schneidmiller | A01M 1/023 | 43/107 |
| 2012/0151823 A1 * | 6/2012 | Donoho | A01M 1/026 | 43/123 |
| 2012/0204476 A1 * | 8/2012 | Frisch | A01M 1/14 | 43/123 |
| 2012/0204477 A1 * | 8/2012 | Fairleigh | A01M 1/103 | 43/121 |
| 2012/0246998 A1 * | 10/2012 | Vasudeva | A01M 1/023 | 43/123 |
| 2013/0180161 A1 * | 7/2013 | Vasudeva | A01M 1/14 | 43/123 |
| 2014/0033597 A1 * | 2/2014 | Vasudeva | A01M 1/10 | 43/132.1 |
| 2014/0165452 A1 * | 6/2014 | Rocha | A01M 1/08 | 43/139 |
| 2015/0366210 A1 * | 12/2015 | Olson | A01M 1/103 | 43/132.1 |
| 2017/0105403 A1 * | 4/2017 | Azzarello | A01M 1/023 | |
| 2019/0159440 A1 * | 5/2019 | Zheng | A01M 1/223 | |
| 2019/0159441 A1 * | 5/2019 | Zheng | A01M 1/023 | |
| 2020/0375169 A1 * | 12/2020 | Zheng | A01M 1/02 | |
| 2020/0404897 A1 * | 12/2020 | Lillamand | A01M 1/026 | |

FOREIGN PATENT DOCUMENTS

| | | |
|---|---|---|
| CN | 104430262 A | 3/2015 |
| CN | 108902077 A | 11/2018 |
| CN | 110122446 A | 8/2019 |
| CN | 212116770 U | 12/2020 |
| KR | 20190068718 A | 6/2019 |
| WO | WO-2014019073 A1 * | 2/2014 ............ A01M 1/023 |

OTHER PUBLICATIONS

Merged translation of WO-2014019073-A1 (Year: 2014).*
International Search Report dated Mar. 25, 2021 for corresponding PCT Application No. PCT/CN2020/139790.
Written Opinion of the International Search Authority in corresponding International application No. PCT/CN2020/139790.

* cited by examiner

INSECT TRAP

CROSS REFERENCE OF RELATED APPLICATIONS

The present application claims priority of International Patent Application No. PCT/CN2020/139790, filed on Dec. 27, 2020, which claims priority of Chinese Utility Model Application No. 201922425784.3, filed on Dec. 30, 2019, the entire contents of which are hereby incorporated by reference.

TECHNICAL FIELD

The present disclosure relates to the technical field of pest control, and particularly relates to an insect trap.

BACKGROUND

Bedbugs, small nocturnal insects of Cimicidae family, live on the blood of humans and other warm-blooded hosts. Detection and control of the bedbugs are extremely difficult and time-consuming due to their mysterious behaviors. It is particularly so for common bed bugs (i.e., *Cimex lectularius*), which have greatly adapted to the human environment. Other species of bed bugs, for example, *C. hemipterus*, cause nuisance to people and/or animals as well. Although bedbugs have been under control in many countries and regions, such as the United States of America, they resurge as a result of explosion of tourism around the world in recent years. What's worse, dependent on their intrinsic features, bedbugs will be difficult to eradicate once found in some place. Thus, an effective insect killer is needed, to identify the presence of bed bugs and kill them efficiently before they are out of control.

The trap of the insect trap in the prior art has a complex internal structure, an uncompact structure, a high production cost, and a large volume.

SUMMARY

In view of the above technical problems, an insect trap is provided, which has simple and compact structure, and can reasonably reduce the production cost and the volume of the product.

The following technical solution is employed in the present disclosure. An insect trap is provided, which includes a trap assembly and a trapping box with an opening at an upper end. The trapping box is provided with a killing component therein. The trap assembly includes a housing with an accommodating cavity, and a carbon dioxide generator arranged in the accommodating cavity. A through hole is formed in the lower wall of the housing and above the trapping box. The carbon dioxide generator is provided with a gas outlet at a position above the through hole, and the gas outlet is directly connected with one end of the through hole.

The insect trap of the present disclosure having the above structure has the following advantages compared with related art.

Because the gas outlet of the carbon dioxide generator of the insert trap according to the present disclosure is directly connected with one end of the through hole, a pipe structure can be omitted, thus simplifying the structure of the trapping box, making the structure more compact, and reducing the cost and volume of the product.

In the figure, 1. trap assembly, 101. housing, 102. accommodating cavity, 103. cover, 104. first absorbent member, 105. opening of the housing 106. controller box, 107. button switch, 108. through hole, 109. interface, 110. escape groove, 111. engaging groove, 112. positioning groove, 2. trapping box, 201. connecting member, 202. engaging ring, 203. positioning block, 204. partition, 205. interior area, 206. exterior area, 207. opening of the trapping box, 208. killing component, 3. carbon dioxide generator, 301. body, 302. lug, 304. upper cover, 305. gas outlet, 4. space.

DESCRIPTION OF THE EMBODIMENTS

To facilitate the understanding of the present application, various aspects of the present application will be described in further detail with reference to the accompanying drawings. It should be understood that these detailed descriptions are merely descriptions of exemplary embodiments of the present application, and not intended to limit the scope of the present application in any way. Throughout the description, the same reference numbers refer to the same elements.

In the figures, for ease of description, the thickness, size and shape of objects are slightly exaggerated, and the drawings are merely exemplary and not drawn strictly to scale.

It should be further understood that the words "comprising", "including", "having", "comprise" and "containing", when used to represent existence of features, integrals, steps, operations, elements and/or components in the description, are not intended to be interpreted as excluding the existence or addition of one or more of other features, integrals, steps, operations, elements, components or combinations thereof. Besides, when such words as "at least one" follow a list in which features are contained, they are used to modify the whole listed features rather than a single one in the list.

Figure 1:
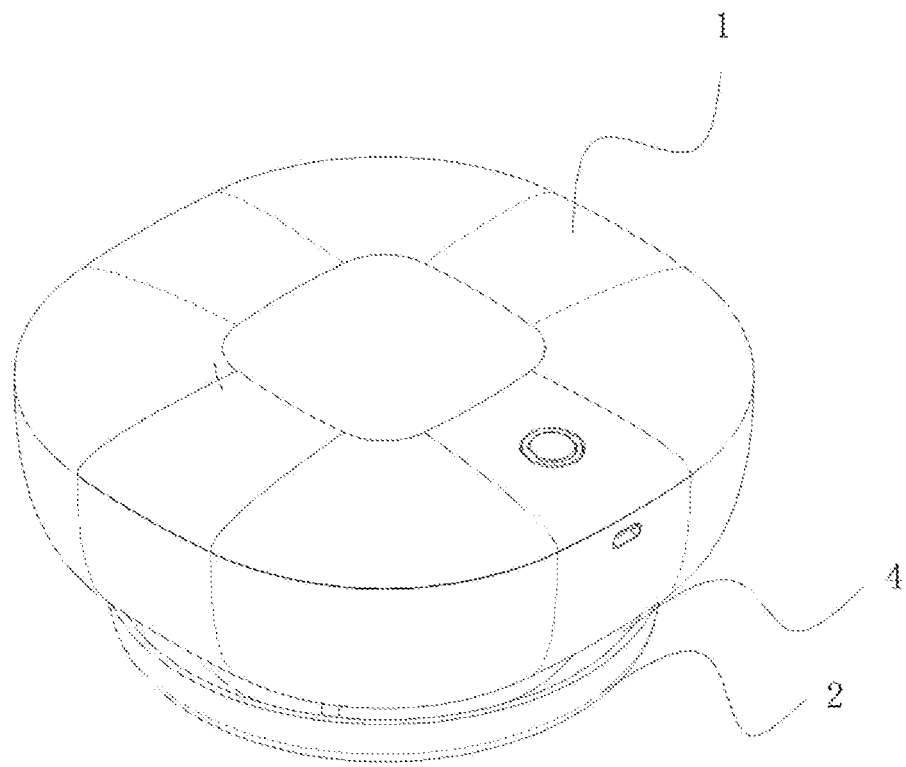
FIG. 1 is a schematic perspective structural view of an insect trap of the present disclosure.
Figure 2:
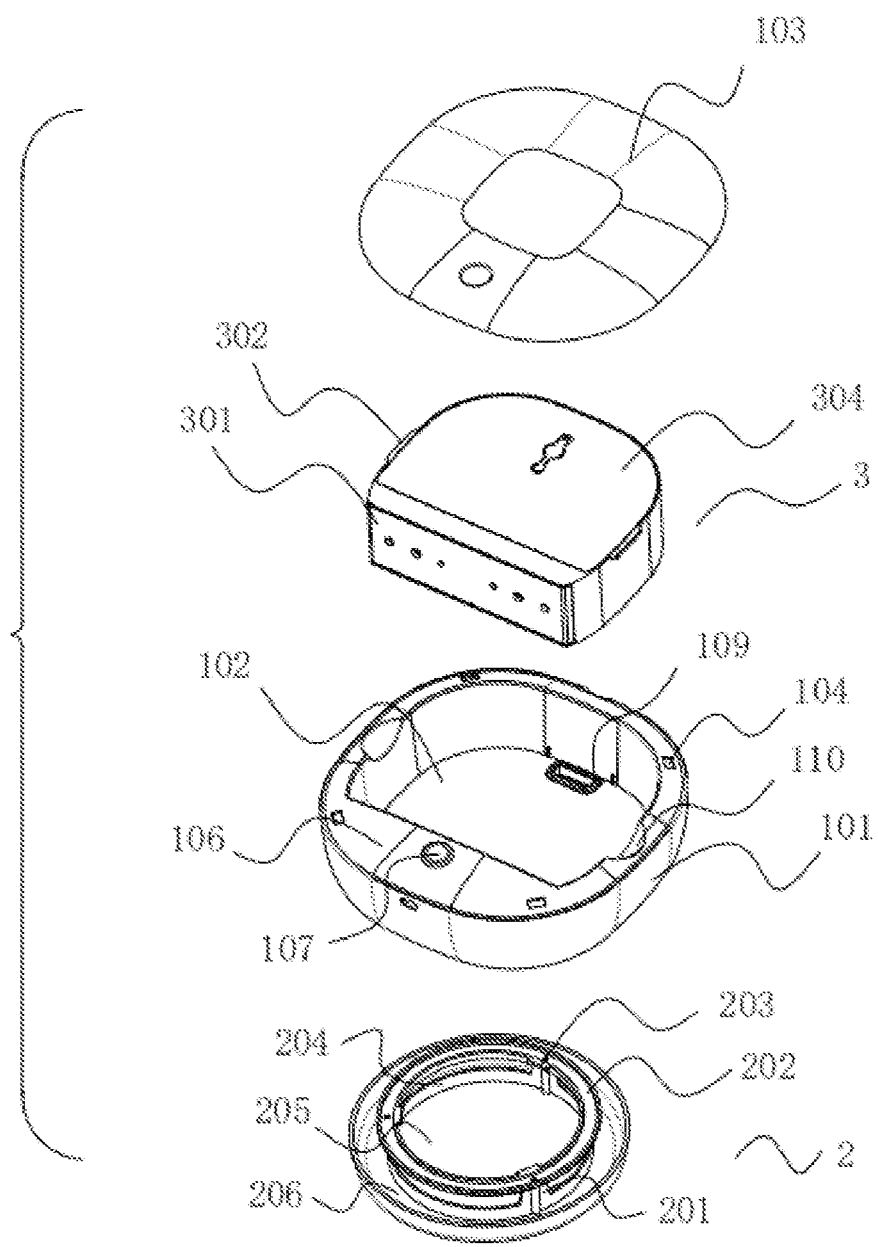
FIG. 2 is a schematic exploded structural view of an insect trap of the present disclosure.
Figure 3:
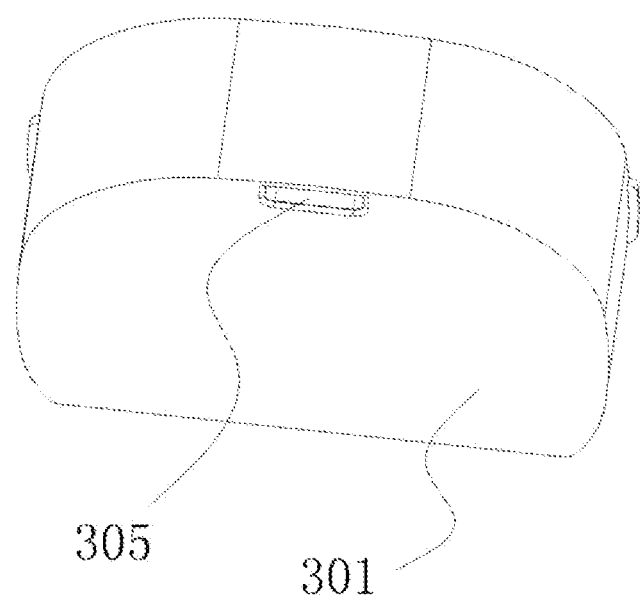
FIG. 3 is a schematic perspective structural view of a carbon dioxide generator in an insect trap of the present disclosure.
Figure 4:
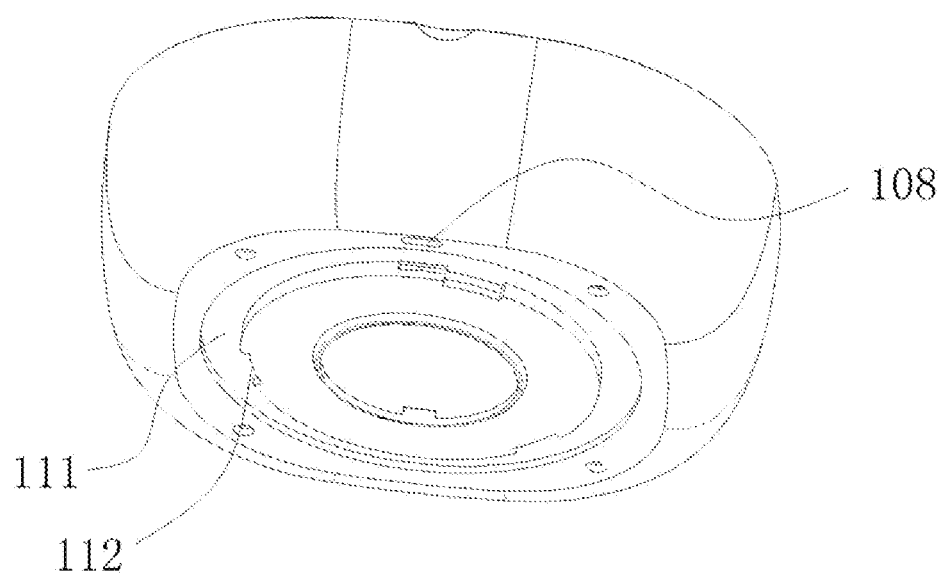
FIG. 4 is a schematic perspective structural view of a housing in an insect trap of the present disclosure.

As shown in FIGS. 1 to 3, an insect trap according to the present disclosure includes a trap assembly 1 and a trapping box 2.

The trap assembly 1 includes a housing 101 with an accommodating cavity 102, wherein the housing 101 is fitted with a cover 103, and the cover 103 is covered on the housing 101 for covering the accommodating cavity 102. A first absorbent member 104 is arranged on an upper end surface of the housing 101, a second absorbent member is arranged on the cover 103 at a position corresponding to the first absorbent member 104, and the first absorbent member 104 and second absorbent member attract each other. The first absorbent member 104 is a magnet, and the second absorbent member is an iron sheet; or the first absorbent member 104 is an iron sheet, and the second absorbent member is a magnet. The housing 101 is provided with a controller box 106 therein, in which a controller is arranged. The accommodating cavity 102 is provided with a carbon dioxide generator 3 therein. The carbon dioxide generator 3 may be the one known in the prior art and will not be repeated here. The controller box 106 is provided with a contact on a side wall, which is electrically connected to the controller. A body 301 of the carbon dioxide generator 3 is provided with an resilient contact. When the carbon dioxide generator 3 is mounted in the accommodating cavity 102, the resilient contact is compressed, and pressed against the contact, so that the internal circuit of the carbon dioxide generator 3 is turned on, and the carbon dioxide generator 3 works under the control of the controller. A button switch 107 is provided on an outer wall of the controller box 106, which is connected to the controller, and used to control the turning on or off of the controller.

A through hole 108 is formed in the lower wall of the housing 101 and above the trapping box 102, and a pipe (not shown) is arranged in the through hole 108. One end of the pipe is provided with an interface 109 connected to the lower wall of the housing 101. The other end of the pipe communicates with the exterior. The interface 109 is clamped with the gas outlet 305. The carbon dioxide produced by the carbon dioxide generator 3 is led out of the housing 101 through the pipe. Two sides of the carbon dioxide generator 3 are provided with two lugs 302 respectively, and escape grooves 110 corresponding to the lugs 302 are provided at an opening 105 of the housing 101. The carbon dioxide generator 3 includes the body 301, and an upper cover 304 made of a transparent material, and an inner wall of the body 301 is provided with a liquid level indicator. A heating element is arranged in a central portion of a lower surface of the housing 101, which is connected to the controller, and configured to generate heat to lure mosquitoes.

The upper end of the trapping box 2 is provided with an opening 207. A plurality of connecting members 201 are provided in a central portion of a bottom of the trapping box 2; and in this specific embodiment, the connecting members 201 are connecting posts, and four connecting posts are arranged and distributed evenly in the central portion at the bottom of the trapping box 2. The height of the connecting post is higher than that of the trapping box 2. An engaging ring 202 is connected onto the connecting post, and an engaging groove 111 is provided on the lower surface of the housing 101 and on an outer side of the heating element. An inner wall of the engaging ring 202 is connected with a positioning block 203, and a positioning groove 112 is provided on a side wall of the engaging groove 111. The engaging ring 202 is engaged in the engaging groove 111 and the positioning block 203 is engaged in the positioning groove 112.

A space 4 for insects to pass through is formed between an upper edge of a side wall of the trapping box 2 and the trap assembly 1. That is, due to the presence of the connecting member 201, the distance between the side wall of the trapping box 2 and the lower surface of the trap assembly 1 is extended, so that the insects can only climb into the trapping box 2, instead of climbing onto the trap assembly 1 along the trapping box 2. The through hole 108 is located above the trapping box 2, and the carbon dioxide outputted from the through hole 108 is charged into the trapping box 2.

The bottom of the trapping box 2 is provided with a circle of closed partition 204 that divides the trapping box 2 into an interior area 205 and an exterior area 206. In this specific embodiment, the partition 204 is connected between two adjacent connecting posts. The partition 204 and the connecting posts are connected in an end-to-end manner to form a closed ring. In this specific embodiment, the trapping box 2 is of circular shape, and the side wall of the trapping box 2 is of annular shape. The height of the partition 204 is lower than the height of the side wall of the trapping box 2. The interior area 205 is located right below the heating element. An adhesive (not shown) is arranged in the interior area 205, and the adhesive is mixed with an attractant. The inner surface of the side wall of the trapping box 2, the bottom of the exterior area 206, the side wall of the partition 204 close to the exterior area 206 and the side walls of the connecting posts are respectively coated with a smoothing agent (not shown). The smoothing agent is one or two or more selected from talcum powder, polytetrafluoroethylene and diatomite.

The adhesive and the attractant form the killing component 208, which can be added or replaced with other structures, such as an electric net.

When the insect trap of the present disclosure operates, the button switch 107 is turned on, and the controller controls the carbon dioxide generator 3 and the heating element to operate. Then the carbon dioxide released by the carbon dioxide generator 3 is introduced into the trapping box 2 via the pipe. Under the lure by carbon dioxide, the heating element, and the attractant in the interior area, the insects will climb into the trapping box 2 along the outside wall of the trapping box 2. Since the exterior area 206 is coated with a smoothing agent, it is difficult for the insects to climb out of the trapping box. Instead, the insects move toward the interior area 205, crawl into the interior area 205, and are further adhered by the adhesive until dead. With a good insect killing effect, the insect trap can also be applied for killing mosquitoes or flies.

What is claimed is:

1. An insect trap, comprising:
    a trap assembly; and
    a trapping box with an opening at an upper end, the trapping box being provided with a killing component therein,
    wherein the trap assembly comprises;
        a housing with an accommodating cavity; and
        a carbon dioxide generator arranged in the accommodating cavity; and a through hole is formed in a lower wall of the housing and above the trapping box;
        wherein the carbon dioxide generator is provided with a gas outlet at a position above the through hole; and
    a bottom of the trapping box is provided with a circle of closed partition that divides the trapping box into an interior area and an exterior area, the partition is connected between two adjacent connecting posts of a plurality of connecting posts to form the circle of closed partition; and
    wherein the kill component comprises an adhesive arranged in the interior area, and an attractant mixed with the adhesive; and
    each of an inner surface of a side wall of the trapping box, a bottom of the exterior area, a side wall of the partition close to the exterior area, and side walls of the connecting posts is coated with a smoothing agent.

2. The insect trap according to claim 1, wherein the carbon dioxide generator is provided with two lugs, one of the lugs on each of two sides, and escape grooves corresponding to the lugs are provided at an opening of the housing.

3. The insect trap according to claim 1, wherein the carbon dioxide generator comprises a body and an upper cover made of a transparent material.

4. The insect trap according to claim 1, wherein the plurality of connecting posts are provided in a central portion at a bottom of the trapping box, wherein an engaging member is connected onto the connecting posts, an engaging groove is provided on a lower surface of the housing, and the engaging member is engaged in the engaging groove; and a space for insects to pass through is formed between the trapping box and the lower surface of the housing.

5. The insect trap according to claim 4, wherein an inner wall of the engaging member is connected with a positioning block, the engaging groove is also of a ring shape, a positioning groove is provided on a side wall of the engaging groove, the engaging member is engaged in the engaging groove and the positioning block is engaged in the positioning groove.

6. The insect trap according to claim 1, wherein a height of the partition is lower than that of the side wall of the trapping box.

7. The insect trap according to claim 1, wherein the smoothing agent is one or more selected from talcum powder, polytetrafluoroethylene and diatomite.

* * * * *